(12) United States Patent
Yang et al.

(10) Patent No.: US 8,908,396 B2
(45) Date of Patent: Dec. 9, 2014

(54) CONTROL CIRCUIT FOR CONTROLLING THE MAXIMUM OUTPUT CURRENT OF POWER CONVERTER AND METHOD THEREOF

(75) Inventors: Ta-Yung Yang, Milpitas, CA (US); Li Lin, Taipei (TW); Yue-Hong Tang, Nantou County (TW); Jung-Sheng Chen, Kaohsiung (TW)

(73) Assignee: System General Corp., Taipei Hsien (TW)

( * ) Notice: Subject to any disclaimer, the term of this patent is extended or adjusted under 35 U.S.C. 154(b) by 269 days.

(21) Appl. No.: 13/611,091

(22) Filed: Sep. 12, 2012

(65) Prior Publication Data
US 2013/0063986 A1    Mar. 14, 2013

Related U.S. Application Data

(60) Provisional application No. 61/534,118, filed on Sep. 13, 2011.

(51) Int. Cl.
*H02M 3/335* (2006.01)
*H02M 1/00* (2006.01)

(52) U.S. Cl.
CPC .. *H02M 3/33507* (2013.01); *H02M 2001/0003* (2013.01)
USPC ......................... 363/21.16; 363/21.17; 363/97

(58) Field of Classification Search
USPC ............ 363/21.04, 21.07, 21.08, 21.09, 21.1, 363/21.12, 21.15, 21.16, 21.17, 21.18, 97
See application file for complete search history.

(56) References Cited

U.S. PATENT DOCUMENTS

| | | | |
|---|---|---|---|
| 6,879,501 B2 * | 4/2005 | Mori | 363/56.03 |
| 6,914,789 B2 * | 7/2005 | Kinoshita et al. | 363/21.12 |
| 6,977,824 B1 | 12/2005 | Yang et al. | |
| 7,016,204 B2 | 3/2006 | Yang et al. | |
| 2008/0298095 A1 * | 12/2008 | Chuang et al. | 363/21.12 |

* cited by examiner

*Primary Examiner* — Nguyen Tran
(74) *Attorney, Agent, or Firm* — Rosenberg, Klein & Lee

(57) ABSTRACT

A control circuit of the power converter according to the present invention comprises a feedback circuit, an output circuit and an adaptive clamping circuit. The feedback circuit generates a feedback signal in accordance with an output of the power converter. The output circuit generates a switching signal in accordance with the feedback signal for regulating the output of the power converter. The adaptive clamping circuit limits the level of the feedback signal under a first level for a first load condition. The feedback circuit determines a slew rate of the feedback signal for increasing the level of the feedback signal from the first level to a second level. The adaptive clamping circuit is disabled and the level of the feedback signal can be increased to the second level for a second load condition.

12 Claims, 4 Drawing Sheets

CONTROL CIRCUIT FOR CONTROLLING THE MAXIMUM OUTPUT CURRENT OF POWER CONVERTER AND METHOD THEREOF

BACKGROUND OF THE INVENTION

1. Field of the Invention

The present invention relates to a power converter, and more particularly, to the control circuit of the power converter.

2. Description of Related Art

FIG. 1 shows a conventional power converter. The power converter comprises a bridge rectifier 35, capacitors 30 and 45, a power transistor 20, resistors 25, 31 and 32, a rectifier 40, a controller 100, and a transformer 10 with a primary-side and a secondary-side. The primary-side includes a primary winding $N_P$ and an auxiliary winding $N_A$. The secondary-side includes a secondary winding $N_S$. One terminal of the capacitor 30 is coupled to an output of the bridge rectifier 35 and one terminal of the primary winding $N_P$. The other terminal of the capacitor 30 is coupled to a ground. The bridge rectifier 35 rectifies an AC input voltage $V_{AC}$ to a DC input voltage $V_{IN}$ at the capacitor 30, and the DC input voltage $V_{IN}$ is supplied to the primary winding $N_P$.

A drain terminal of the power transistor 20 is connected to the other terminal of the primary winding $N_P$ in series. The power transistor 20 is used to switch the transformer 10 and control transferring of power energy from the primary winding $N_P$ of the transformer 10 to the auxiliary winding $N_A$ and the secondary winding $N_S$ of the transformer 10. The controller 100 is coupled to a gate terminal of the power transistor 20. A switching signal $S_W$ is generated by the controller 100. The switching signal $S_W$ is supplied to the power transistor 20 and controls the power transistor 20 to switch the transformer 10. In other words, the controller 100 generates the switching signal $S_W$ coupled to switch the transformer 10 via the power transistor 20. The resistor 25 is coupled between a source terminal of the power transistor 20 and the ground. A switching current $I_P$ of the transformer 10 flows through the transistor 20 that generates a current-sense signal $V_{CS}$ at the resistor 25. The current-sense signal $V_{CS}$ is supplied to the controller 100.

The rectifier 40 and the capacitor 45 are coupled to the secondary winding $N_S$ of the transformer 10 for generating an output voltage $V_O$ and an output current $I_{O1}$ of the power converter. The resistors 31 and 32 are connected in series. The resistors 31 and 32 are coupled from the auxiliary winding $N_A$ of the transformer 10 to the ground for detecting the output voltage $V_O$ and generating a signal $V_S$ during the switching of the transformer 10. The signal $V_S$ is generated at a joint of the resistors 31 and 32. An input terminal VS of the controller 100 is coupled to the joint and receives the signal $V_S$. The signal $V_S$ is correlated to the output voltage $V_O$ and is related to the transformer's demagnetizing time. The demagnetizing time of the transformer 10 is used for controlling the output current $I_{O1}$. The switching signal $S_W$ is generated in accordance with the signal $V_S$ (the reflected voltage of the transformer 10) for regulating the output (output voltage $V_O$ and/or the output current $I_{O1}$) of the power converter.

In order to control the output current $I_{O1}$, for example providing a constant output current for the battery charge or LED lighting, etc., it requires developing a current-feedback loop for the regulation. The power converter normally includes the output voltage and/or the output current regulation. Refer to the skill of the output current regulation, it had been disclosed in a prior art "Control circuit for controlling output current at the primary side of a power converter", U.S. Pat. No. 6,977,824. The detail of the voltage-loop and the current-loop operation can be found in the prior art of "Close-loop PWM controller for primary-side controlled power converters", U.S. Pat. No. 7,016,204.

For achieving a stable feedback loop, the current-feedback loop is compensated to a low bandwidth in general. Thus, a higher overshoot current would be produced during the load change, particularly when the load is changed from the light load to the heavy load, as shown in FIG. 2.

The drawback of the conventional power converter is the slow response of the current-feedback circuit. In order to achieve the loop stability, the bandwidth of frequency compensation is low. Thus, its loop response to the load changing is slow. FIG. 2 shows an output current waveform that is controlled by the controller 100 of FIG. 1. When the load (Load) is changed, the output current $I_{O1}$ includes the higher overshoot current within a $T_D$ period. The $T_D$ period is related to the loop response of the current-feedback circuit.

SUMMARY OF THE INVENTION

The objective of the present invention is to provide a control circuit of the power converter and a control method; it prevents the power converter from occurrence of the higher overshoot current when the load is changed.

The present invention provides a control circuit of the power converter and a control, method. The control circuit comprises a feedback circuit, an output circuit and an adaptive clamping circuit. The feedback circuit generates a feedback signal in accordance with an output of the power converter. The output circuit generates a switching signal in accordance with the feedback signal for regulating the output of the power converter. The adaptive clamping circuit limits the level of the feedback signal under a first level for a first load condition. The feedback circuit determines a slew rate of the feedback signal for increasing the level of the feedback signal from the first level to a second level. The adaptive clamping circuit is disabled and the level of the feedback signal can be increased to the second level for a second load condition.

DESCRIPTION OF THE PREFERRED EMBODIMENTS

Figure 1:
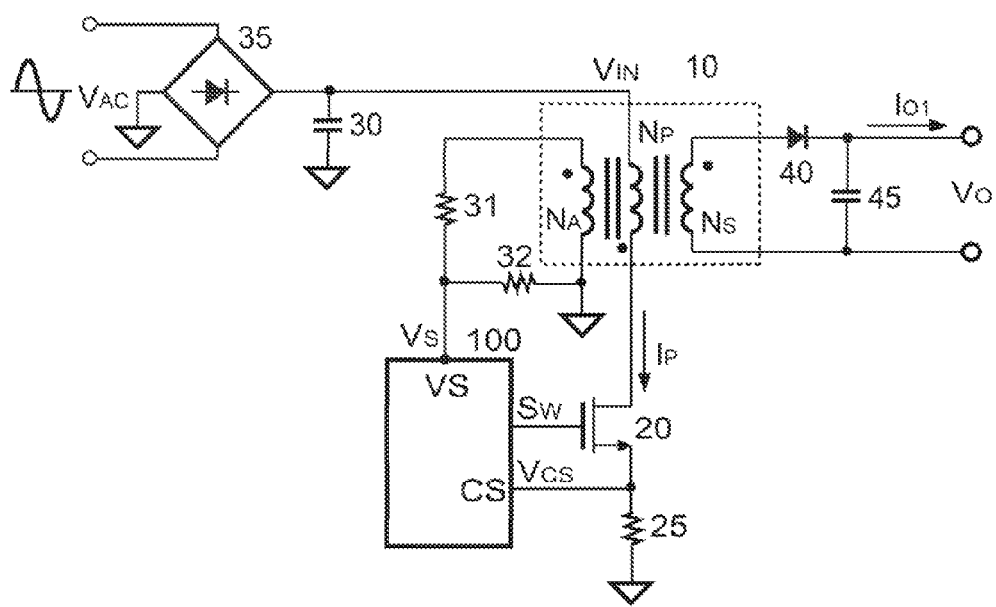
FIG. 1 illustrates a schematic circuit of a conventional power converter.
Figure 2:
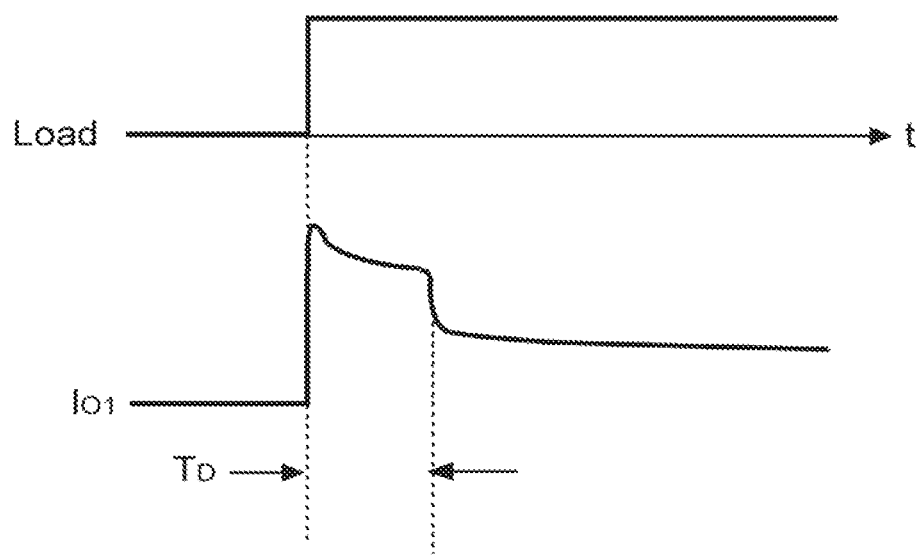
FIG. 2 shows the waveform of the conventional output current $I_{O1}$ corresponding to the load changing.
Figure 3:
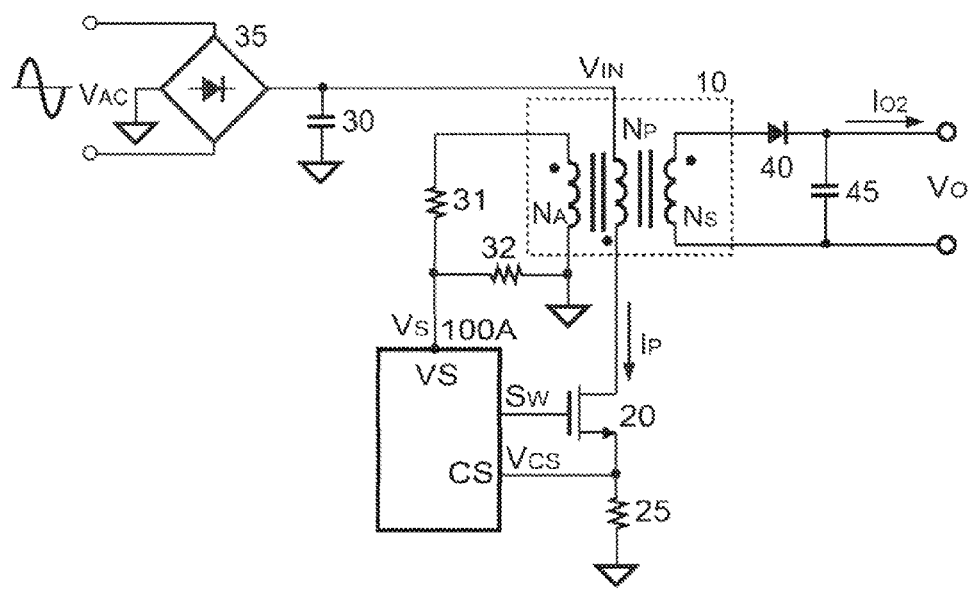
FIG. 3 shows a schematic circuit of an embodiment of a power converter in accordance with the present invention.

FIG. 3 shows a schematic circuit of a power converter in accordance with an embodiment of the present invention. The circuit of the power converter is similar with the circuit shown in FIG. 1, so it is not described herein again. Although it is similar with the circuit shown in FIG. 1, the power converter of the present invention further provides a control circuit 100A to control the maximum value of an output current $I_{O2}$ for solving the higher overshoot current generated by the controller 100 of the conventional power converter (shown in FIG. 1). The power converter is a primary-side controlled power converter, wherein no opto-coupler is needed for a feedback loop control.

Figure 4:
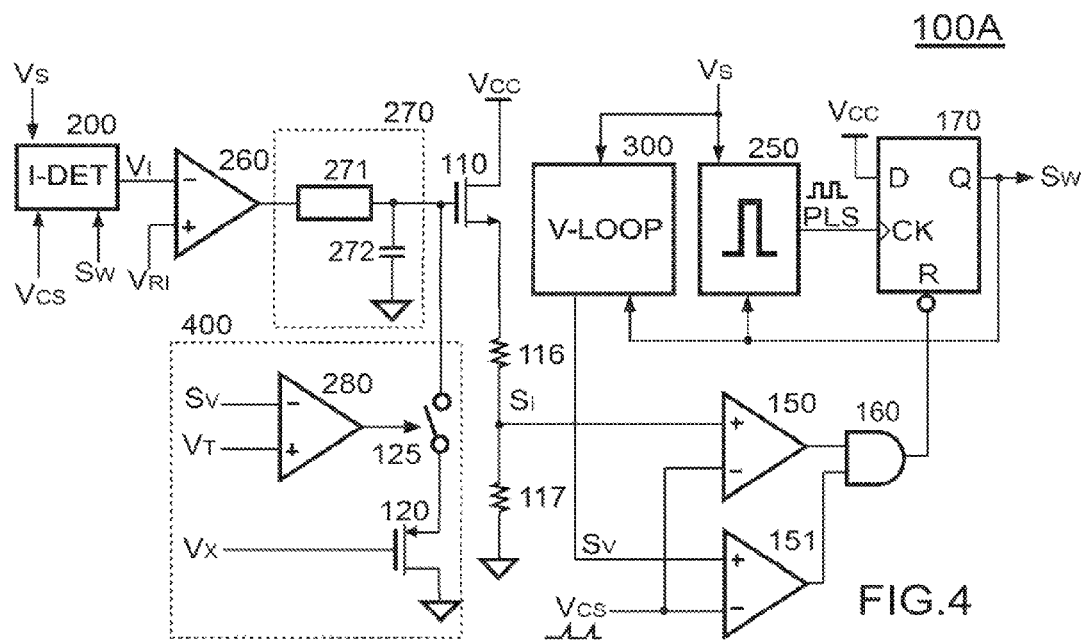
FIG. 4 shows a schematic circuit of an embodiment of the control circuit in accordance with the present invention.

FIG. 4 is a schematic circuit of the control circuit 100A in accordance with an embodiment of the present invention. The control circuit 100A comprises a feedback circuit and an output circuit. The feedback circuit comprises a current detection circuit (I-DET) 200, an error amplifier 260, a frequency compensation network 270 and a level-shift circuit to generate a current-loop feedback signal $S_I$ in accordance with an output of the power converter. The current-loop feedback signal $S_I$ is a feedback signal. The feedback circuit is a current-feedback circuit. The frequency compensation network 270 works as a timing circuit. It is to say that the timing circuit is operated by the frequency compensation network 270 of the feedback circuit. The current-feedback circuit develops a current-feedback loop.

The current detection circuit 200 is coupled to the joint of the resistors 31 and 32 (as shown in FIG. 3) for receiving the signal $V_S$. The current detection circuit 200 is coupled to detect the current-sense signal $V_{CS}$ and the signal $V_S$ through input terminals CS and VS of the control circuit 100A (as shown in FIG. 3) for generating a current-feedback signal $V_I$. The level of the current-feedback signal $V_I$ is correlated to the level of the output current $I_{O2}$ of the power converter. A negative input terminal of the error amplifier 260 is coupled to the current detection circuit 200 to receive the current-feedback signal $V_I$. A positive input terminal of the error amplifier 260 is coupled to receive a threshold $V_{RI}$.

The frequency compensation network 270 is connected to an output of the error amplifier 260 for the loop compensation. A device 271 and a capacitor 272 form the frequency compensation network 270. It is a low-pass filter. One terminal of the device 271 is coupled to the output of the error amplifier 260. The other terminal of the device 271 is coupled to one terminal of the capacitor 272. The other terminal of the capacitor 272 is coupled to the ground. The device 271 can be a resistor in accordance with one embodiment of the present invention. A transistor 110 and resistors 116 and 117 develop the level-shift circuit. The level shift circuit is coupled to an output of the frequency compensation network 270 to generate the current-loop feedback signal $S_I$ (feedback signal). A drain terminal of the transistor 110 is coupled to receive a supply voltage $V_{CC}$. A gate terminal of the transistor 110 is drove by the output of the frequency compensation network 270. A source terminal of the transistor 110 is coupled to one terminal of the resistor 116. The other terminal of the resistor 316 is coupled to one terminal of the resistor 117. The other terminal of the resistor 117 is coupled to the ground. The current-loop feedback signal $S_I$ is generated at the joint of the resistors 116 and 117.

The output circuit comprises comparators 150 and 151, an AND gate 160, a flip-flop 170, and a pulse generation circuit 250. The output circuit generates a switching signal $S_W$ in accordance with the current-loop feedback signal $S_I$ (feedback signal) for regulating the output of the power converter. In other words, the current-loop feedback signal $S_I$ is used for regulating the output current $I_{O2}$ of the power converter.

The current-loop feedback signal $S_I$ is coupled to a positive input terminal of the comparator 150 of the output circuit to compare with the current-sense signal $V_{CS}$ revived by a negative input terminal of the comparator 150. An output terminal of the comparator 150 generates a signal, the signal is coupled to a reset input terminal R of the flip-flop 170 to reset the flip-flop 170 through the AND gate 160 for the turn-off of the switching signal $S_W$. The switching signal $S_W$ is coupled to switch the transformer 10 (shown in FIG. 3) for regulating the output (output voltage $V_O$ and/or the output current $I_{O2}$) of the power converter. The flip-flop 170 is enabled by a pulse signal PLS for generating the switching signal $S_W$ at an output terminal Q. A clock input terminal CK is coupled to an output terminal of the pulse generation circuit 250 to receive the pulse signal PLS. The supply voltage $V_{CC}$ is supplied with an input terminal D of the flip-flop 170. The pulse signal PLS is generated by the pulse generation circuit 250 in response to the signal $V_S$. The pulse generation circuit 250 is coupled to the joint of the resistors 31 and 32 (as shown in FIG. 3). The pulse generation circuit 250 further receives the switching signal $S_W$.

The control circuit 100A further comprises a voltage-feedback circuit (V-LOOP) 300. The voltage-feedback circuit 300 is a voltage-feedback loop. The voltage-feedback circuit 300 is coupled to the joint of the resistors 31 and 32 for receiving the signal $V_S$ to generate the voltage-loop feedback signal $S_V$. The voltage-feedback circuit 300 further receives the switching signal $S_W$. The voltage-loop feedback signal $S_V$ is coupled to a positive input terminal of the comparator 151 of the output circuit to compare with the current-sense signal $V_{CS}$ revived by a negative input terminal of the comparator 151. An output terminal of the comparator 151 of the output circuit is coupled to the AND gate 160 for the reset of the flip-flop 170 and the turn-off of the switching signal $S_W$. It is to say that the voltage-feedback circuit 300 is applied to regulate the output voltage $V_O$ of the power converter.

An adaptive clamping circuit 400 is applied to the frequency compensation network 270 to clamp the level of the current-loop feedback signal $S_I$ (feedback signal). In other words, the adaptive clamping circuit 400 is coupled to the feedback circuit to clamp the level of the feedback signal. The adaptive clamping circuit 400 comprises a switch 125, a transistor 120 and a comparator 280. A first terminal of the switch 125 is coupled to the frequency compensation network 270 of the feedback circuit. In other words, the switch 125 is coupled to the feedback circuit that the switch 125 is also coupled to the current-feedback loop. A second terminal of the switch 125 is coupled to a source terminal of the transistor 120. Through the switch 125, the source terminal of the transistor 120 is coupled to the capacitor (such as the capacitor 272) of the frequency compensation network 270 of the feedback circuit. A reference signal $V_X$ is coupled to a gate terminal of the transistor 120 to control the transistor 120 for determining the clamped level of the current-loop feedback signal $S_I$. A drain terminal of the transistor 120 is coupled to the ground.

An output of the comparator 280 is coupled to a control terminal of the switch 125 for controlling the on/off of the switch 125 in response to the voltage-loop feedback signal $S_V$ and a threshold $V_T$. The voltage-loop feedback signal $S_V$ and the threshold $V_T$ are applied to a negative input terminal and a positive input terminal of the comparator 280 respectively. The comparator 280 compares the level of the voltage-loop feedback signal $S_V$ with the threshold $V_T$ for controlling the on/off of the switch 125. The level of the current-loop feedback signal $S_I$ is clamped under a specific level (determined by the reference signal $V_X$) when the voltage-loop feedback signal $S_V$ is under the threshold $V_T$ that the switch 125 is turned on and the adaptive clamping circuit 400 is enabled. Once the voltage-loop feedback signal $S_V$ is higher than the threshold $V_T$, the adaptive clamping circuit 400 is disabled. After that the current-loop feedback signal $S_I$ can be gradually increased according to the timing of the frequency compensation network 270. Therefore, the current-loop feedback signal $S_I$ is limited under a first level (determined by the reference signal $V_X$) for a first load condition. When the load is changed (a second load condition) that requires a higher output current, the current-loop feedback signal $S_I$ can be increased gradually from the first level to a second level for increasing the output current $I_{O2}$ (as shown in FIG. 3). It is to say that the second level is higher than the first level and the second load condition is heavier than the first load condition. For example, the first load condition is light load condition, and the second load condition is heavy load condition.

The frequency compensation network 270 works as the timing circuit to determine the slew rate of the level of the current-loop feedback signal $S_I$ for the increase of the output current $I_{O2}$ when the adaptive clamping circuit 400 is disabled. The level of the voltage-loop feedback signal $S_V$ can be used for determining the first load condition and the second load condition according to a preferred embodiment of the present invention.

Figure 5:
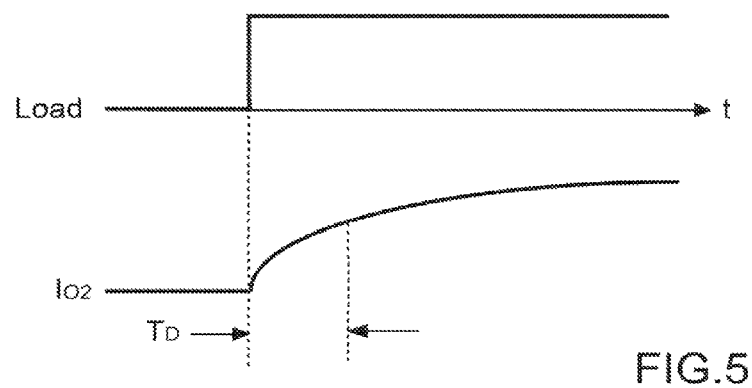
FIG. 5 shows the waveform of the output current $I_{O2}$ corresponding to the load changing in accordance with the present invention.

FIG. 5 shows the waveform of the output current $I_{O2}$ that is produced by circuit shown in FIG. 4 that has the adaptive clamping circuit 400. The output current $I_{O2}$ is gradually increased within a $T_D$ period, no overshoot current is occurred in response to the load change.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A control circuit of a power converter, comprising:
   a feedback circuit, generating a feedback signal in accordance with an output of the power converter;
   an output circuit, generating a switching signal in accordance with the feedback signal for regulating the output of the power converter; and
   an adaptive clamping circuit, limiting the level of the feedback signal under a first level for a first load condition;
   wherein the feedback circuit determines a slew rate of the feedback signal for increasing the level of the feedback signal from the first level to a second level; the adaptive clamping circuit is disabled and the level of the feedback signal can be increased to the second level for a second load condition.

2. The control circuit as claimed in claim 1, wherein the feedback circuit comprises a timing circuit, the timing circuit determines the slew rate of the feedback signal for increasing the level of the feedback signal from the first level to the second level.

3. The control circuit as claimed in claim 2, wherein the timing circuit is operated by a frequency compensation network of the feedback circuit.

4. The control circuit as claimed in claim 1, wherein the switching signal is coupled to switch a transformer of the power converter for regulating the output of the power converter.

5. The control circuit as claimed in claim 1, wherein the second level is higher than the first level, and the second load condition is heavier than the first load condition.

6. The control circuit as claimed in claim 1, wherein the feedback circuit is a current-feedback circuit, the feedback signal is a current-loop feedback signal.

7. The control circuit as claimed in claim 1, wherein the enable or disable of the adaptive clamping circuit is determined by the level of a voltage-loop feedback signal.

8. The control circuit as claimed in claim 7, wherein the adaptive clamping circuit comprises:
   a switch, having a first terminal and a second terminal, wherein the first terminal is coupled to the feedback circuit;
   a transistor, coupled between the second terminal of the switch and a ground, and controlled by a reference signal, wherein the level of the feedback signal is limited under the first level for the first load condition when the switch is turned on, and the first level is determined by the reference signal; and
   a comparator, comparing the level of the voltage-loop feedback signal with a threshold for controlling the on/off of the switch.

9. The control circuit as claimed in claim 1, wherein the feedback circuit further comprises a current-feedback loop.

10. The control circuit as claimed in claim 1, further comprising a voltage-feedback loop.

11. The control circuit as claimed in claim 1, wherein the power converter is a primary-side controlled power converter; in which no opto-coupler is needed for a feedback loop control.

12. A method for controlling a power converter, comprising:
   generating a feedback signal in accordance with an output of the power converter;
   generating a switching signal in accordance with the feedback signal for regulating the output of the power converter;
   clamping the level of the feedback signal under a first level for a first load condition; and
   generating a slew rate for increasing the level of the feedback signal from the first level to a second level;
   wherein the level of the feedback signal can be increased to the second level for a second load condition.

* * * * *